(12) United States Patent
Chen et al.

(10) Patent No.: US 11,880,410 B2
(45) Date of Patent: Jan. 23, 2024

(54) SYSTEMS AND METHODS FOR PROACTIVE INFORMATION DISCOVERY WITH MULTIPLE SENSES

(71) Applicant: MicroStrategy Incorporated, Tysons Corner, VA (US)

(72) Inventors: Liang Chen, Fairfax, VA (US); Yan Li, Fairfax, VA (US); Jinliang Zeng, Vienna, VA (US); Feng Ding, Fairfax, VA (US)

(73) Assignee: MICROSTRATEGY INCORPORATED, Tysons Corner (VA)

( * ) Notice: Subject to any disclaimer, the term of this patent is extended or adjusted under 35 U.S.C. 154(b) by 356 days.

(21) Appl. No.: 17/165,355

(22) Filed: Feb. 2, 2021

(65) Prior Publication Data

US 2021/0240773 A1 Aug. 5, 2021

Related U.S. Application Data

(60) Provisional application No. 62/969,378, filed on Feb. 3, 2020.

(51) Int. Cl.
| | |
|---|---|
| *G06F 16/9032* | (2019.01) |
| *G06K 9/00* | (2022.01) |
| *H04W 4/80* | (2018.01) |
| *G06K 7/14* | (2006.01) |
| *G06K 7/10* | (2006.01) |
| *G10L 15/22* | (2006.01) |

(Continued)

(52) U.S. Cl.
CPC ... *G06F 16/90324* (2019.01); *G06K 7/10297* (2013.01); *G06K 7/1413* (2013.01); *G06V 40/168* (2022.01); *G06V 40/171* (2022.01); *G06V 40/172* (2022.01); *G10L 15/22* (2013.01); *H04W 4/80* (2018.02); *G06V 30/10* (2022.01)

(58) Field of Classification Search
CPC .......... G10L 15/22; G10L 15/26; H04W 4/80; G06F 16/90324; G06V 40/168; G06V 40/171; G06V 40/172; G06V 30/10; G06K 7/1413; G06K 7/10297
See application file for complete search history.

(56) References Cited

U.S. PATENT DOCUMENTS

| | | | | |
|---|---|---|---|---|
| 9,385,873 | B2 * | 7/2016 | Kupinsky | H04W 4/24 |
| 9,760,645 | B1 * | 9/2017 | Park | G06K 19/06037 |
| 10,078,867 | B1 * | 9/2018 | Chan | G06Q 40/02 |

(Continued)

*Primary Examiner* — Etienne P Leroux
(74) *Attorney, Agent, or Firm* — Bookoff McAndrews, PLLC

(57) ABSTRACT

According to certain aspects of the disclosure, a computer-implemented method may be used for analytics integration into electronic mediums. The method may include determining at least one insight discovery function from a plurality of insight discovery functions on a user device and enabling a software module based on the selection of the at least one insight discovery functions. Additionally, the method may include determining at least one key term based on the enabled software module, and determining at least one electronic data card associated with the at least one key term. Additionally, the method may include presenting the at least one data card to the user device based on a user interaction with the at least one insight discovery function on the user device.

17 Claims, 13 Drawing Sheets

(51) Int. Cl.
    *G06V 40/16*         (2022.01)
    *G06V 30/10*         (2022.01)

(56) References Cited

U.S. PATENT DOCUMENTS

| | | | |
|---|---|---|---|
| 10,979,409 B2* | 4/2021 | Lu | H04W 12/04 |
| 2002/0002707 A1* | 1/2002 | Ekel | H04N 21/6131 |
| | | | 348/E7.071 |
| 2007/0143544 A1* | 6/2007 | Lin | G06K 19/07732 |
| | | | 711/115 |
| 2010/0255778 A1* | 10/2010 | Lovell | H04M 1/72412 |
| | | | 455/41.2 |
| 2011/0026838 A1* | 2/2011 | King | G06Q 30/00 |
| | | | 382/209 |
| 2013/0297308 A1* | 11/2013 | Koo | G06F 3/167 |
| | | | 704/235 |
| 2016/0140649 A1* | 5/2016 | Kleve | H04W 12/06 |
| | | | 705/307 |
| 2019/0199718 A1* | 6/2019 | Nigam | H04L 9/3231 |
| 2020/0193591 A1* | 6/2020 | Kamiyama | G06T 7/60 |
| 2021/0295030 A1* | 9/2021 | Hwang | G06V 10/945 |

* cited by examiner

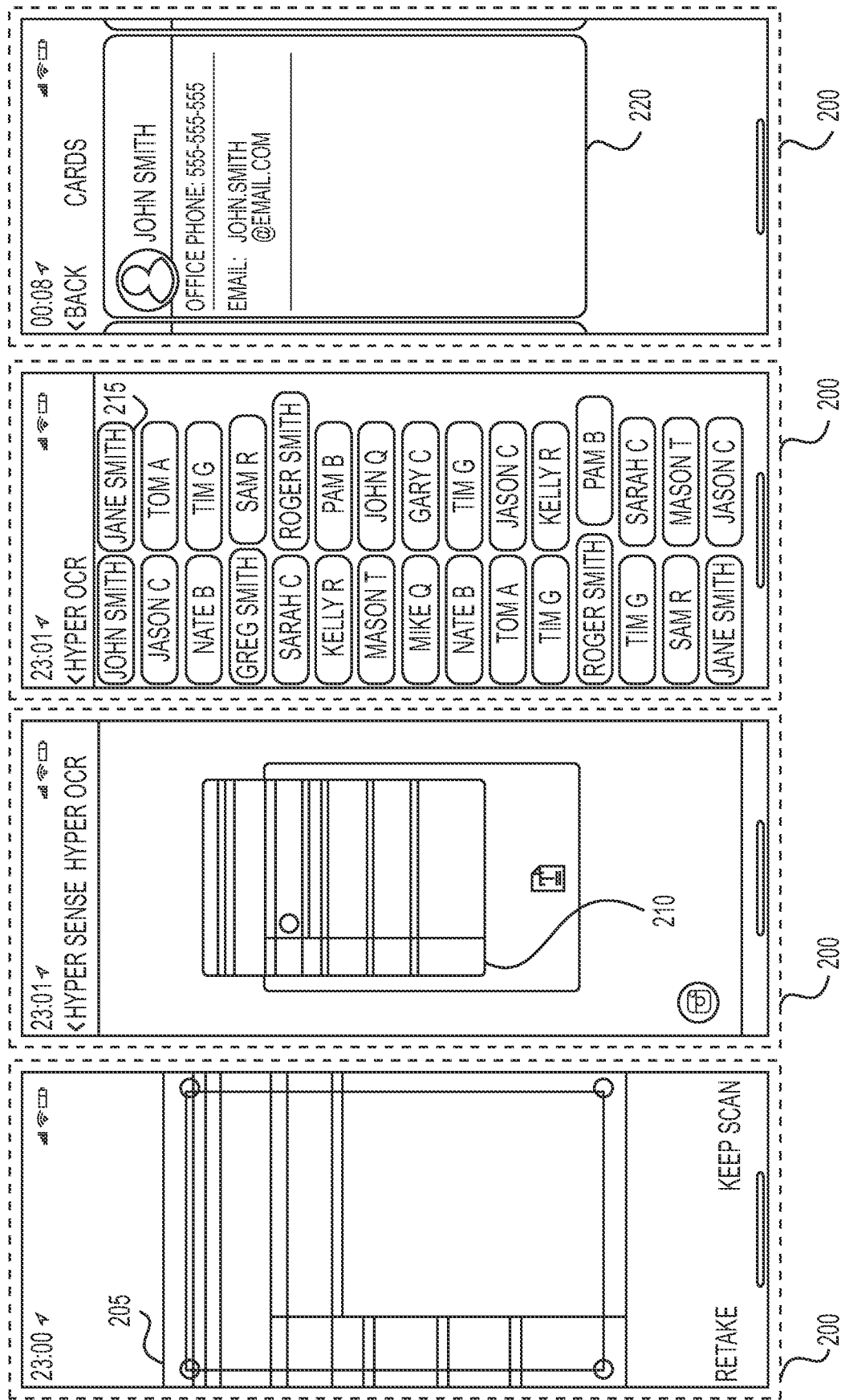

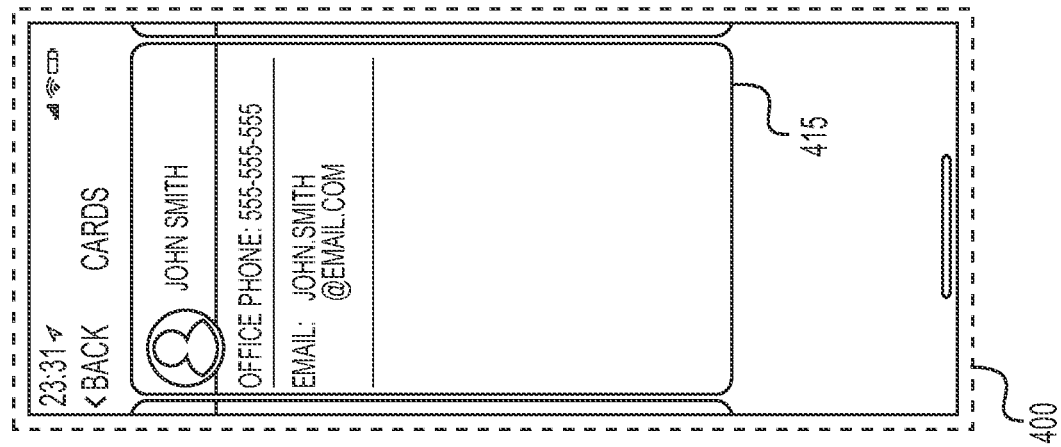
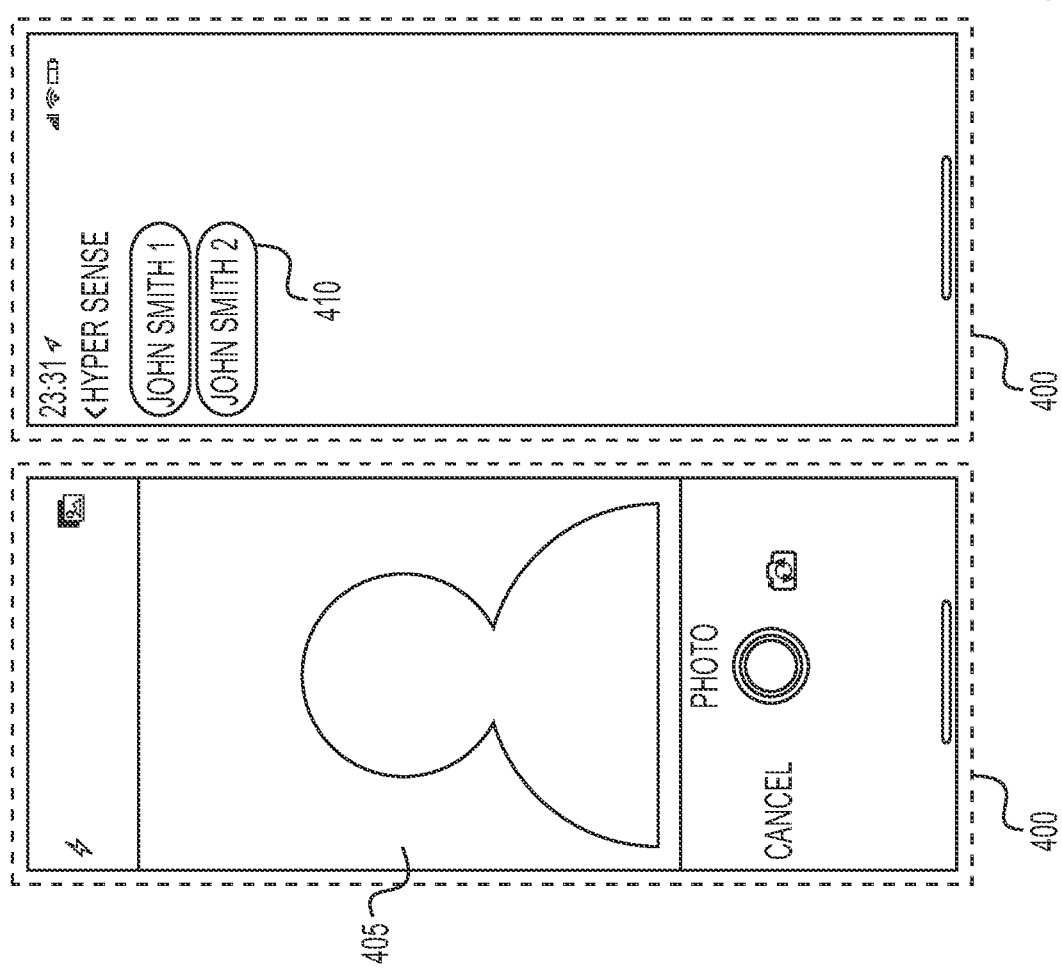

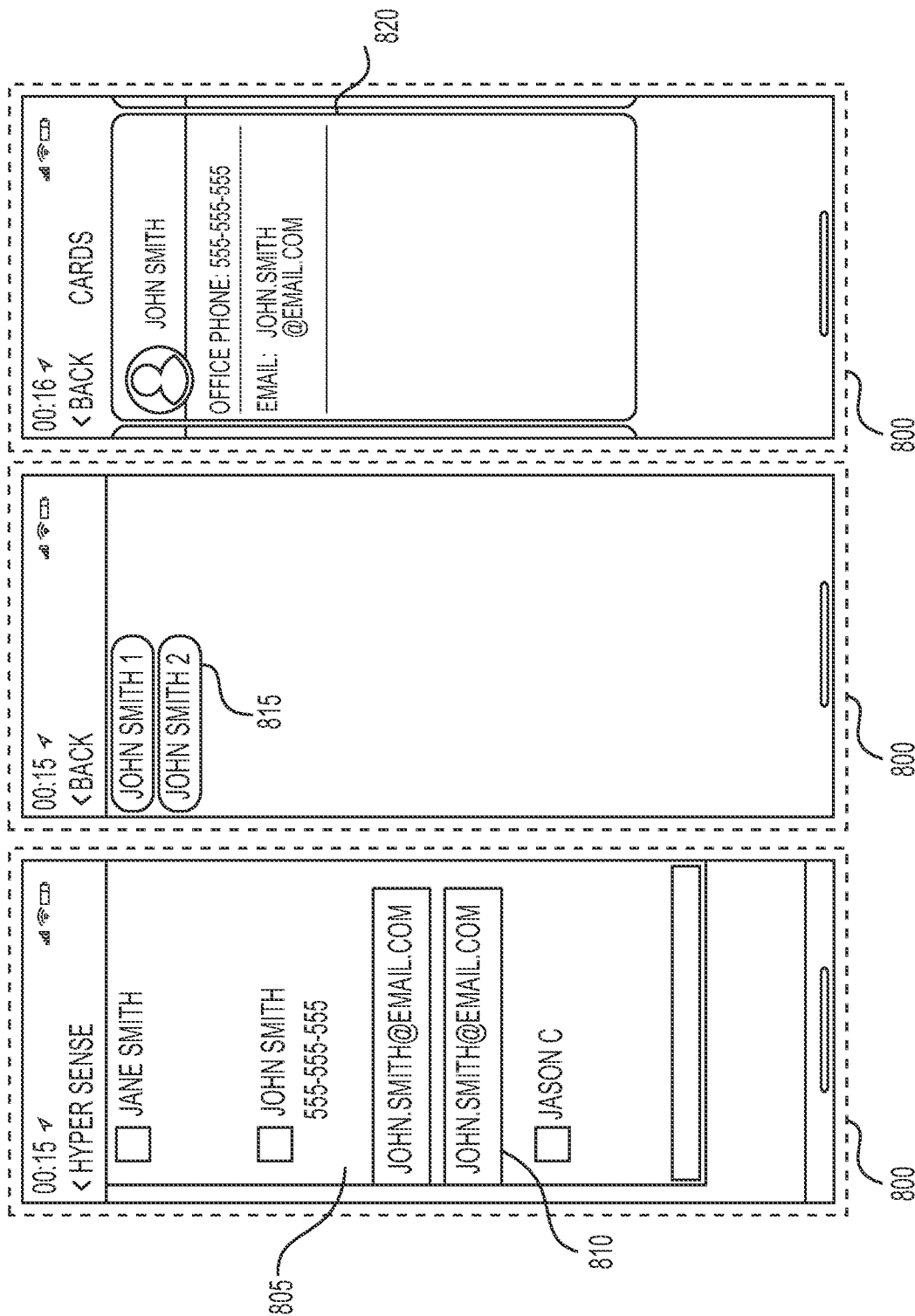

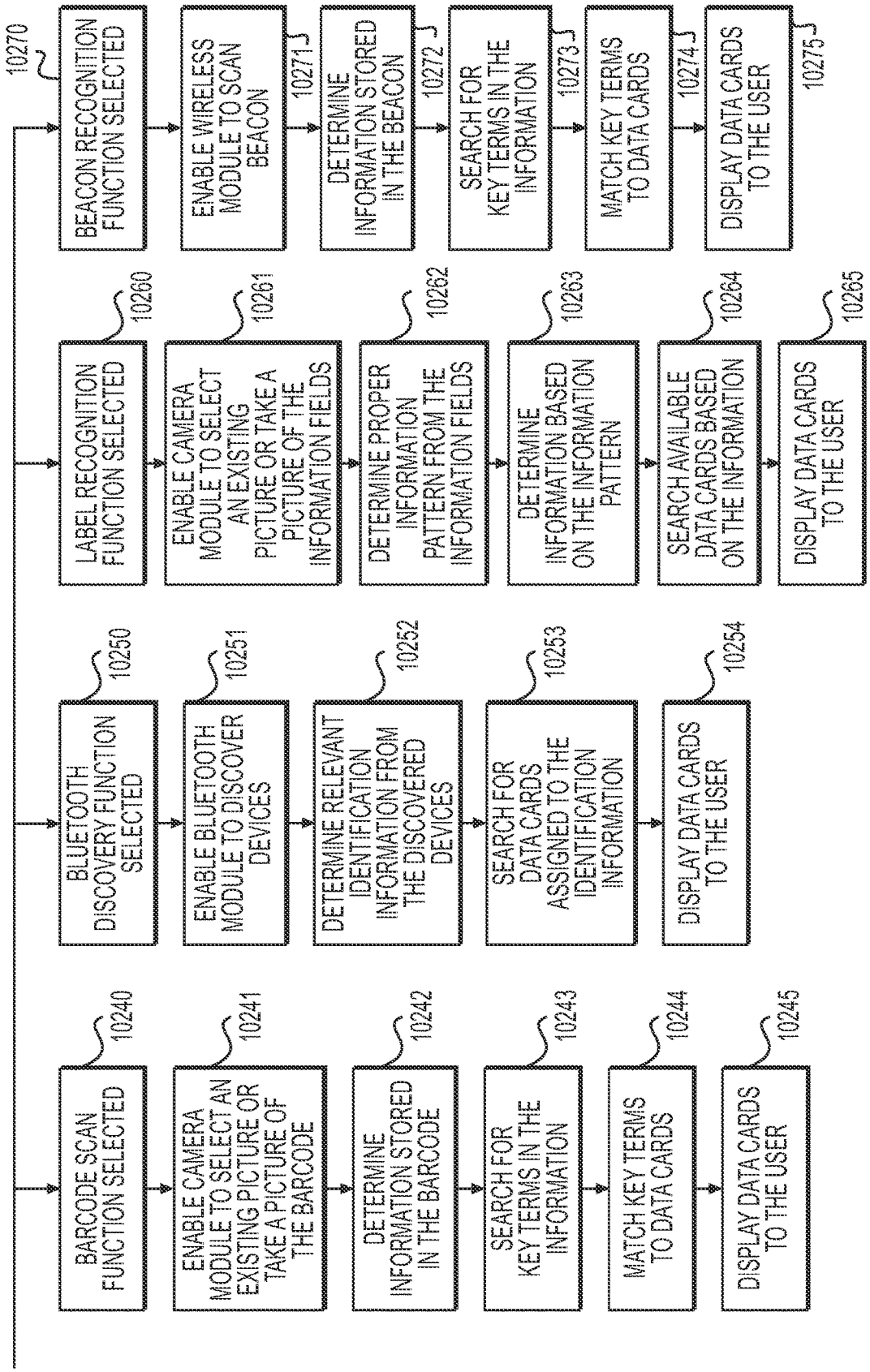

SYSTEMS AND METHODS FOR PROACTIVE INFORMATION DISCOVERY WITH MULTIPLE SENSES

RELATED APPLICATION(S)

This application claims priority to U.S. Provisional Application No. 62/969,378 filed Feb. 3, 2020, the entire disclosure of which is hereby incorporated herein by reference in its entirety.

TECHNICAL FIELD

Various embodiments of the present disclosure relate generally to providing on demand contextually relevant information.

INTRODUCTION

Electronic networks commonly contain more information than is possible for a user to efficiently search and assimilate. A user may utilize a search engine to look up information, but this may lead to frustration, as the user may not know the words to perform an optimal search, or may not know how to acquire the most relevant information. Furthermore, requiring the user to determine a query and type the query into a search engine may also take up unnecessary time, which may lead to further negative experiences.

The present disclosure is directed to addressing one or more of these challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

According to certain aspects of the disclosure, non-transitory computer readable media, systems, and methods are disclosed for providing proactive information discovery with multiple senses. Each of the examples disclosed herein may include one or more of the features described in connection with any of the other disclosed examples.

In one example, a computer-implemented method may be used for proactive insight discovery. The method may include determining, by a one or more processors, at least one insight discovery function from a plurality of insight discovery functions on a user device; enabling, by the one or more processors, a software module based on the selection of the at least one insight discovery functions; determining, by the one or more processors, at least one key term based on the enabled software module; determining, by the one or more processors, at least one electronic data card associated with the at least one key term; and presenting, by the one or more processors, the at least one data card to the user device based on a user interaction with the at least one insight discovery function on the user device.

According to another aspect of the disclosure, a computer system for proactive insight discovery may include at least one memory having processor-readable instructions stored therein; and at least one processor configured to access the memory and execute the processor-readable instructions, which when executed by the processor configures the processor to perform a plurality of functions. The functions may comprise determining at least one insight discovery function from a plurality of insight discovery functions on a user device; enabling a software module based on the selection of the at least one insight discovery functions; determining at least one key term based on the enabled software module; determining at least one electronic data card associated with the at least one key term; and presenting the at least one data card to the user device based on a user interaction with the at least one insight discovery function on the user device.

According to still another aspect of the disclosure, a non-transitory computer-readable medium comprising instructions for proactive insight discovery, the non-transitory computer-readable medium storing instructions that, when executed by at least one processor, may configure the at least one processor to perform determining, by a one or more processors, at least one insight discovery function from a plurality of insight discovery functions on a user device; enabling, by the one or more processors, a software module based on the selection of the at least one insight discovery functions; determining, by the one or more processors, at least one key term based on the enabled software module; determining, by the one or more processors, at least one electronic data card associated with the at least one key term; and presenting, by the one or more processors, the at least one data card to the user device based on a user interaction with the at least one insight discovery function on the user device.

Additional objects and advantages of the disclosed embodiments will be set forth in part in the description that follows, and in part will be apparent from the description, or may be learned by practice of the disclosed embodiments. It is to be understood that both the foregoing general description and the following detailed description are exemplary and explanatory only, and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIGS. 2A-2D depict exemplary user interfaces for operating the document scanning sense, according to one aspect of the present disclosure.

FIGS. 4A-4C depict exemplary user interfaces for operating the facial recognition sense, according to one aspect of the present disclosure.

FIGS. 8A-8C depict exemplary user interfaces for operating the label recognition sense, according to one aspect of the present disclosure.

FIG. 10A-10B depict an exemplary flow diagram of operating proactive information discovery with multiple senses, according to one aspect of the present disclosure.

DETAILED DESCRIPTION

Figure 1A:
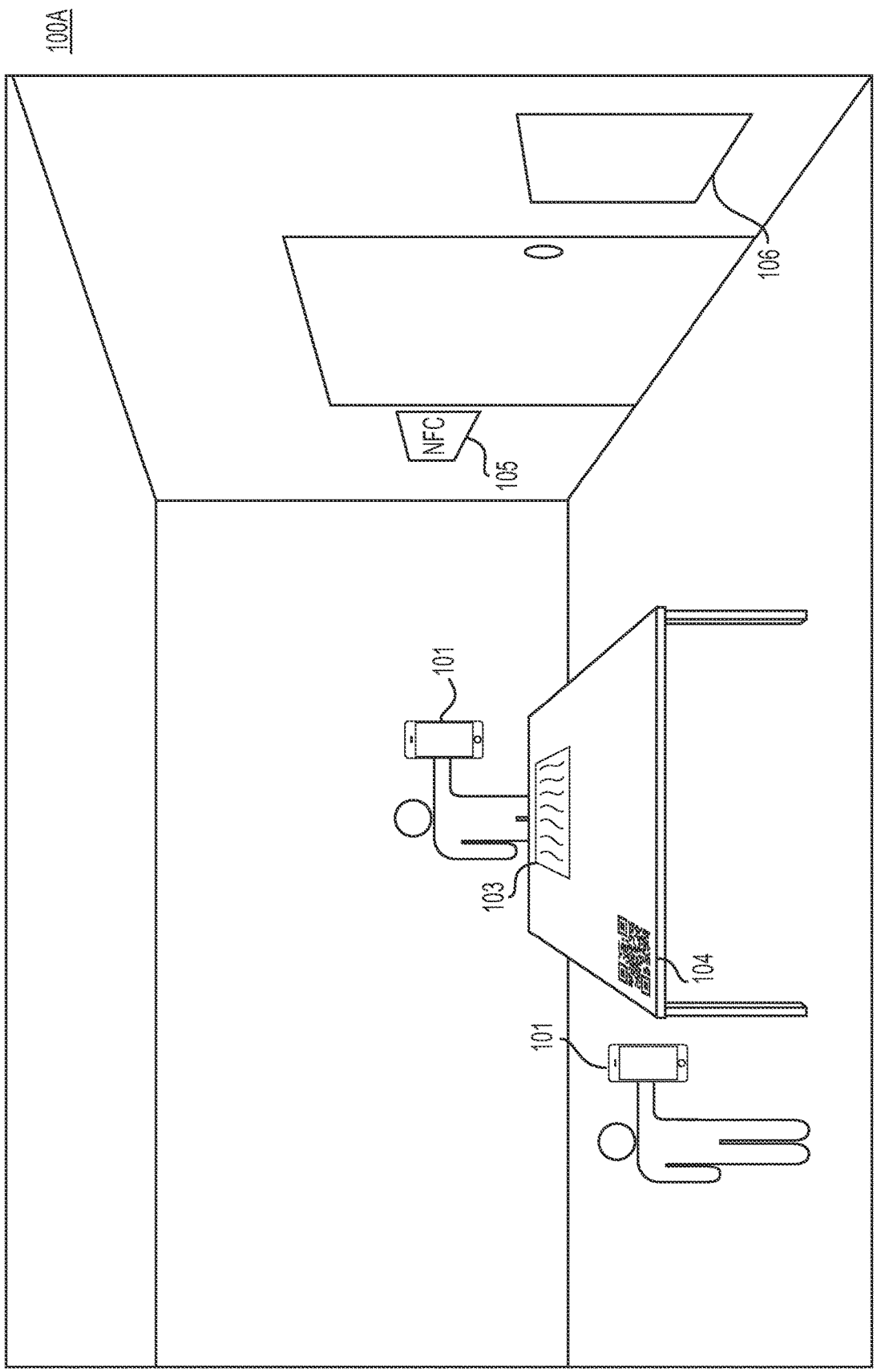
FIGS. 1A and 1B depict an exemplary environment in which systems, methods and other aspects of the present disclosure may be implemented.

The subject matter of the present description will now be described more fully hereinafter with reference to the accompanying drawings, which form a part thereof, and which show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter can be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

In the following description, embodiments will be described with reference to the accompany drawings. Various embodiments of the present disclosure relate generally to methods and systems for analytics integration into electronic mediums.

As described above, users searching for relevant information may be overwhelmed with the amount of information available. Often times the user may have to know in advance how to discover the information or where the information is located. For example, if the user wants to acquire information regarding a specific item or topic, the user would have to input a search query into a search engine to retrieve the information. To retrieve all the relevant information, the user may have to switch between different searching methods to ensure that information is pulled from several sources. Therefore, a need exists to minimize the burden imposed on the user by helping the user proactively discover information around his or her environment. The computing system may provide ability for a user to proactively discover information without user input, and discover information to which the user does not know.

Referring now to the appended drawings, FIG. 1A depicts an exemplary environment 100A in which systems, methods and other aspects of the present disclosure may be implemented. Environment 100A may include one or a plurality of user devices 101 under the operation of one or a plurality of users, a document 103, a barcode 104, an NFC tag 105, and one or more beacons 106. The document 103 may be an electronic document residing on a computing device (e.g. a word processing document on a user device 101 or other device), or may be a physical document. The barcode 104 may be a linear barcode, a 2D barcode, a 3D barcode, a stationary or moving graphic (e.g., a picture, a video, etc.), or a QR code, etc. The placement of the document 103, the barcode 104, the NFC tag 105, and the one or more beacons 106 are exemplary depictions and may be placed in various other locations.

Figure 1B:
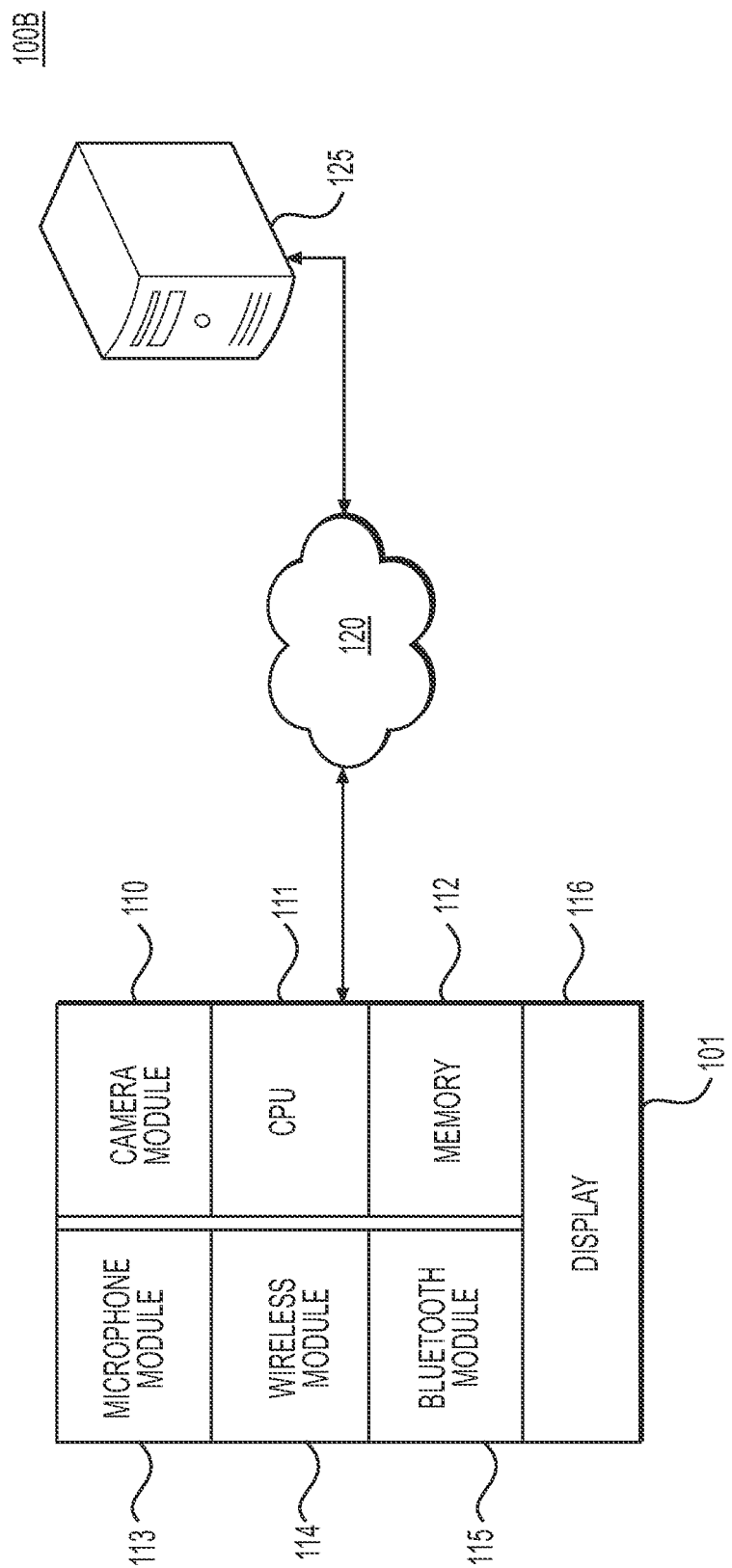

FIG. 1B depicts an exemplary network environment 100B in which systems, methods and other aspects of the present disclosure may be implemented. Environment 100B may include the user device 101 under the operation of one or a plurality of users, a network 120, and server 125. The server 125 may act as a repository for information discoverable by the user of the user device 101. The server 125 may communicate to the user device 101 via a network 120. Such network 120 may be any suitable network or combination of networks and may support any appropriate protocol suitable for communication of data between various components in the system environment 100A and 100B. The network 120 may include a public network (e.g., the Internet), a private network (e.g., a network within an organization), or a combination of public and/or private networks. The server 125 may be implemented using multiple computers that cooperate to perform the functions discussed herein, which may be located remotely from each other.

The user device 101 may be operated by one or more users to perform information discovery functions and may include a camera module 110, a CPU 111, memory 112, a microphone module 113, a wireless module 114, a Bluetooth module 115, and/or a display 116. The wireless module 114 may include hardware for wireless data communication. For example, wireless module 114 may include wireless internet (WiFi), cellular communication, global positioning system (GPS) communication, and other wireless communication standards. In another embodiment, the wireless module 114 and Bluetooth module 115 may be the same module. Examples of user device 101 may include smartphones, wearable computing devices, tablet computers, laptops, and desktop computers.

Environments 100A and 100B may include one or more computer systems configured to gather, process, transmit, and/or receive data. In general, whenever environments 100A and/or 100B are described as performing an operation of gathering, processing, transmitting, or receiving data, it is understood that such operation may be performed by a computer system thereof. In general, a computer system may include one or more computing devices, as described in connection with FIG. 11 below.

FIGS. 2A-2D depict exemplary user interfaces (i.e., display screens 200) for operating the document scanning sense, according to one aspect of the present disclosure. FIG. 2A depicts a display screen 200 of the user device 101. Display screen 200 of FIG. 2A may be triggered based on the user selecting an option of document scanning sense. Upon the selection of the document scanning sense, the user device 101 may activate the camera module 110 and display the preview screen 205 to the user. The user may utilize the preview screen 205 to align the camera onto a document for scanning. The user may also utilize the preview screen 205 to select an existing picture of a document. The existing picture may be a picture taken prior to the user selecting the option of document scanning sense. The existing picture may be located on the user device 101 or may be located on the server 125. The document may be a physical document (e.g., paper based text document), or the document may be a digital document displayed on a screen of a computing device (e.g., a word processor program).

FIG. 2B may depict a display screen 200 of the user device 101 once an image of the document is captured. Upon capturing an image of the document, an optical character recognition (OCR) process may be performed on the captured image to convert the image into a text document containing the text in the original document. The converted text document may be displayed to the user via screen 210. In another embodiment, the optical character recognition process may be performed on a live view of the document displayed by the preview screen 205, without having to capture an image of the document. Once the OCR process is performed on the document, a parsing process may be performed on the text of the document to determine if any key terms are present. Key terms may be terms where associated information is present, such as information that may be displayed via screen 215. Example key terms may include names of users, name of companies, locations, events, etc. As displayed in exemplary FIG. 2C, key terms indicating names of users may have been determined from the text of the document, and resulting users "John Smith" and "Jane Smith" may be displayed to the user via screen 215. The key terms may be displayed via screen 215 with an indication that the key terms may be interactive. For example, the key terms may be displayed as a hyperlink, or a touch-able design element to indicate to the user that more information related to the key terms may be available.

The OCR process and subsequent key term searching may be performed on the user device 101, or at the server 125. If the OCR process is performed on the user device 101, the OCR process may be performed by utilizing a software development kit (SDK) supplied by the device or the operating system implemented on the device. If the OCR process is performed at the server 125, the image of the document may be transmitted from the user device 101 to the server 125 wherein OCR may be performed by utilizing a SDK supplied by the server 125 or the operating system implemented on the server 125, or by a third party software program. Once the text is recognized, a parsing process may be performed on the text of the document and any key terms may be transmitted to the user device 101 for display to the user.

FIG. 2D depicts an exemplary user interface (i.e., display screen 200) for presenting the available information of the key terms to the user. The information may be presented to the user as a data card 220 displaying the relevant information. Relevant information may include, name, contact information, place of employment, and any other available data of the user. If there are more than one data cards available, (e.g., when more than one key terms are present) then the user may navigate between the different data cards using gestures or navigation commands. The data card 220 may be stored locally on the user device 101 and retrieved by the CPU 111 upon an interaction by the user with the key terms. In another embodiment, the data card 220 may be stored on the server 125 and retrieved by the CPU 111 via network 120 upon an interaction by the user with the key terms.

Figure 3B:
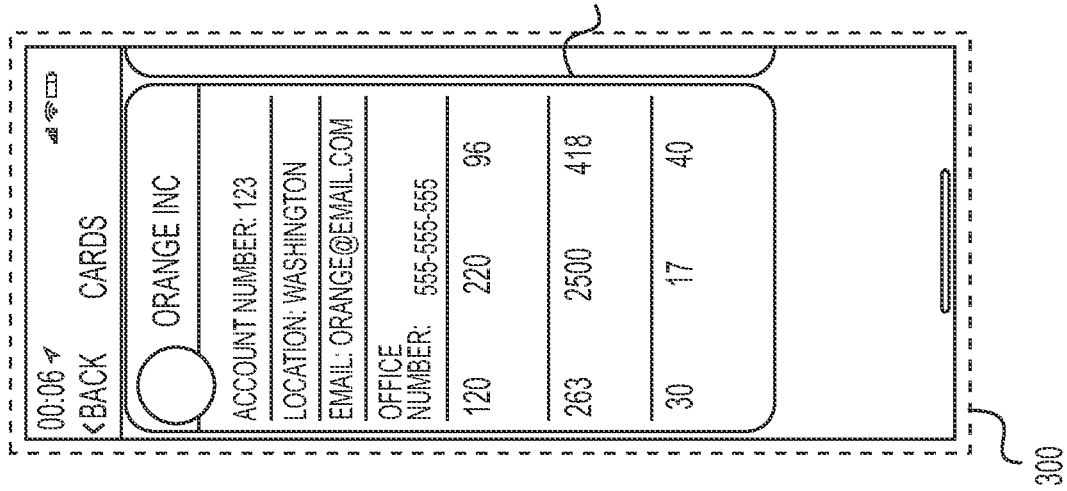
FIGS. 3A-3B depict exemplary user interfaces for operating the speech recognition sense, according to one aspect of the present disclosure.
Figure 3A:
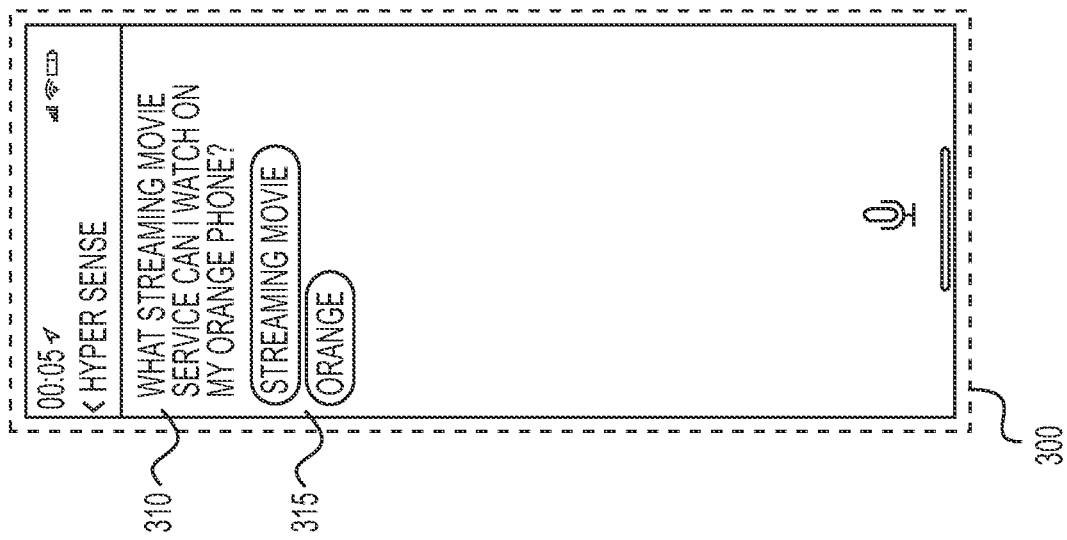

FIGS. 3A-3B depict exemplary user interfaces (i.e., display screens 300) for operating the speech recognition sense, according to one aspect of the present disclosure. FIG. 3A depicts a display screen 300 of the user device 101. Display screen 300 of FIG. 3A may be triggered based on the user selecting the option of the speech recognition sense. Upon the selection of the speech recognition sense, the user device 101 may activate the microphone module 113 and present the display screen 300 to the user. The display screen 300 may include a feedback portion 310 and key term portion 315. The feedback portion 310 may display to the user the speech or words detected by the microphone module 113. The feedback portion 310 may display a recognition of speech in real-time (e.g., display each word as it is being spoken) or display a recognition post speech (e.g., display the complete speech after detection of a completion of the speed). The speech detected by the microphone module 113 may be the speech of the user operating the user device 101 or may be speech from other sources in the vicinity of the user.

Upon capturing the speech, a speech recognition process may be performed on the captured speech to convert the speech into text format. The converted text may be displayed to the user via feedback portion 310. Once the recognition process is performed on the speech, a parsing process may be performed on the text of the speech to determine if any key terms are present. Key terms may be terms where associated information is present, information that may be displayed via key term portion 315. Example key terms may include names of users, name of companies, locations, events, etc. As displayed in exemplary FIG. 3A, the speech "What streaming movie service can I watch on my orange phone" may have been captured by the microphone module 113, and key terms may have been determined from the text of the speech. The determined key terms may include a company named "Streaming movie" and phone manufacture named "orange" as displayed in key term portion 315. The key terms may be displayed via screen 300 with an indication that the key terms may be interactive. For example, the key terms may be displayed as a hyperlink, or a touch-able design element to indicate to the user that more information related to the key terms may be available.

The speech recognition and subsequent key term searching may be performed on the user device 101, or at the server 125. If the speech recognition process is performed in the user device 101, the recognition process may be performed by utilizing a software development kit (SDK) supplied by the device or the operating system implemented on the device. If the recognition process is performed at the server 125, the captured speech may be transmitted from the user device 101 to the server 125 wherein the speech recognition process may be performed by utilizing a SDK supplied by the server 125 or the operating system implemented on the server 125, or by a third party software program.

FIG. 3B depicts an exemplary user interface (i.e., display screens 300) for presenting the available information of the key terms to the user. The information may be presented to the user as a data card 320 displaying the relevant information. Relevant information may include, name, contact information, address, and any other available data of the key terms. If there are more than one data cards available, (e.g., when more than one key terms are present) then the user may navigate between the different data cards using gestures or navigation commands. The data card 320 may be stored locally on the user device 101 and retrieved by the CPU 111 upon an interaction by the user with the key terms. In another embodiment, the data card 320 may be stored on the server 125 and retrieved by the CPU 111 via network 120 upon an interaction by the user with the key terms.

FIGS. 4A-4C depict exemplary user interfaces (i.e., display screens 400) for operating the facial recognition sense, according to one aspect of the present disclosure. FIG. 4A depicts a display screen 400 of the user device 101. Display screen 400 of FIG. 4A may be triggered based on the user selecting an option of facial recognition sense. Upon the selection of the facial recognition sense, the user device 101 may activate the camera module 110 and display the preview screen 405 to the user. The user may utilize the preview screen 405 to align the camera onto a facial element of a person for capture. The user may also utilize the preview screen 405 to select an existing picture of a facial element of a person. The existing picture may be a picture taken prior to the user selecting the option of facial recognition sense. The existing picture may be located on the user device 101 or may be located on the server 125. The facial element of the person may be a person in the vicinity of the user, or may be a picture of a person on a physical document (e.g., paper picture), or may be a picture of a person digitally displayed on a screen on a computing device.

Upon capturing an image of the facial element of the person, a facial recognition process may be performed on the captured image. The facial recognition process may be conducted by machine learning, and/or other facial recognition algorithms. The facial recognition model may start by collecting all images on all user data cards and detecting a facial element present in the images. Next, processing may be conducted on the facial element to determine a coordinate value of all the facial features (e.g., eyes, nose, mouth, etc.) in the images and transform the coordinate values in to a vector value. The vector value may be stored with the associated image. The vector value and the associated image may be stored on the server 125 or locally on the user device 101. A machine learning model may be trained on test images to determine the similarities between the test images and the images of user data cards by comparing the coordinate value of the facial features and the vector value. The trained machine learning model may process the captured image of the facial element of the person by the user device 101 to determine the coordinate value of the facial features and the resulting vector value. The CPU 111 may search the set of vector values of all user data cards to find a matching vector value.

Once a matching vector value is discovered, the facial recognition sense may determine that a user data card matching the image of the facial element of the person captured by the user device 101 is available. Key terms representing the available user data cards may be presented to the user, and the key terms may be the name of the user, phone number of the user, or any other identifiable information of the user. As displayed in exemplary FIG. 4B, key terms indicating names of the user may have been determined from the facial recognition process, and resulting user "John Smith 1" and "John Smith 2" may be displayed to the user via screen 410. The key terms may be displayed via screen 410 with an indication that the key terms may be interactive. For example, the key terms may be displayed as a hyperlink, or a touch-able design element to indicate to the user that more information related to the key terms may be available.

The facial recognition model may be performed on the user device 101, or at the server 125, or a combination of the user device 101 and the server 125. In one embodiment, the process of collecting all the images on all user data cards and processing the facial element present in the images to determine coordinate values and vector values may be performed and saved on the user device 101. Upon capturing the image of the facial element of a person by the user device 101, the process of determining the coordinate values and vector values of the captured image and the matching process may also be performed on the user device.

In another embodiment, the process of collecting all the images on all user data cards and processing the facial element present in the images to determine coordinate values and vector values may be performed and saved on the server 125. The server 125 may then transmit the vector values and the associated user data cards to the user device 101 for storage. Upon capturing the image of the facial element of a person by the user device 101, the process of determining the coordinate values and vector value of the captured image and the matching process may be performed on the user device 101.

In yet another embodiment, the process of collecting all the images on all user data cards and processing the facial element present in the images to determine coordinate values and vector values may be performed and saved on the server 125. Upon capturing the image of the facial element of a person by the user device 101, the captured image may then be transmitted to the server 125. The process of determining the coordinate values and vector value of the captured image and the matching process may be performed on the server 125, and if one or more matches are found, the server 125 transmits the key terms and the user data cards to the user device 101.

FIG. 4C depicts an exemplary user interface 400 for presenting the available information of the key terms to the user. The information may be presented to the user as a user data card 415 displaying the relevant information. Relevant information may include, name, contact information, place of employment, and any other available data of the user. If there are more than one user data cards available, (e.g., when more than one key terms are present) then the user may navigate between the different data cards using gestures or navigation commands. The more than one user data cards may also be displayed in order of closeness of facial match. For example the user data card that is the closest match to the coordinate values and vector values of the person may be displayed first.

Figure 5A:
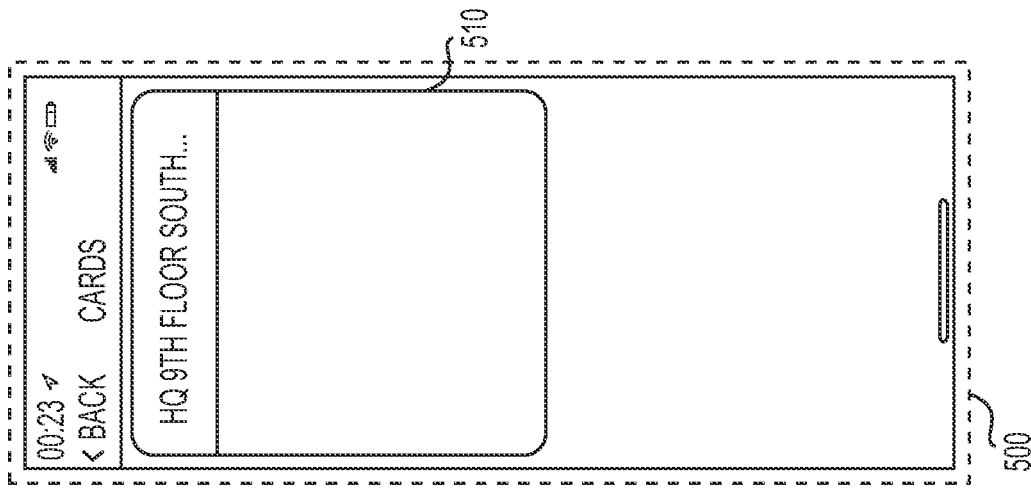
FIGS. 5A-5C depict exemplary user interfaces for operating the near-field communication (NFC) scan sense, according to one aspect of the present disclosure.
Figure 5B:
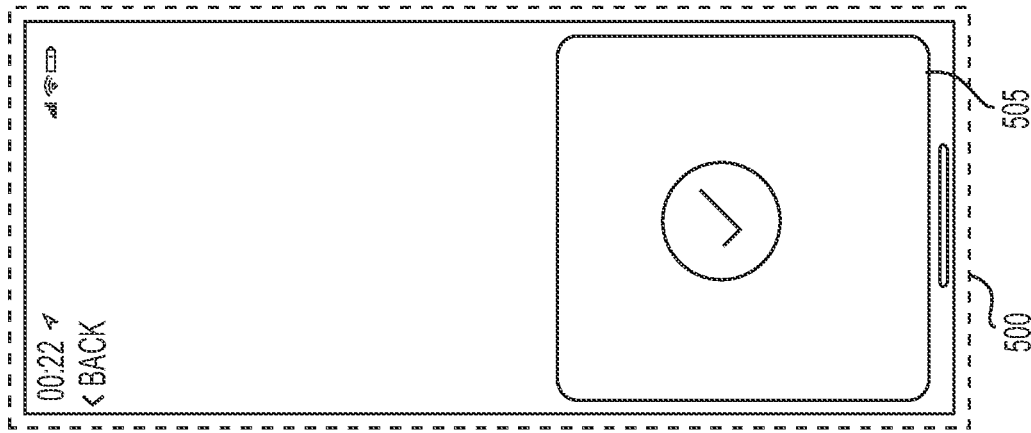
Figure 5C:
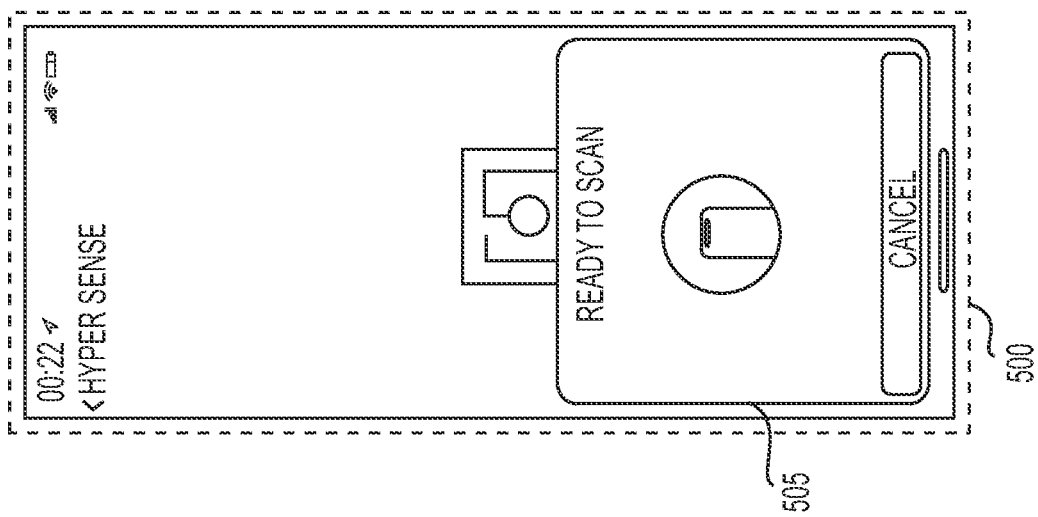

FIGS. 5A-5C depict exemplary user interfaces (i.e., display screens 500) for operating the near-field communication (NFC) scan sense, according to one aspect of the present disclosure. FIG. 5A depicts a display screen 500 of the user device 101. Display screen 500 of FIG. 5A may be triggered based on the user selecting the option of NFC scan sense. The NFC scan sense may be selected by selecting the option on the display 116 of the user device 101, or may be selected by a user pressing a hardware button on the user device 101, or may be selected by holding the user device 101 near a NFC tag 105. Upon the selection of the NFC scan sense, the user device 101 may activate the wireless module 114, and/or the Bluetooth module 115, and display the scanning screen 505 to the user. NFC tags may be passive data stores that can be read, and under some circumstances written to, by an NFC device. The NFC tags may be readable only, or may be readable and rewritable, and may be custom-encoded by their manufactures or use industry specifications. NFC tags may also include radio-frequency identification (RFID) tags.

Upon selection of the NFC scan sense or by placing the user device 101 near a NFC tag, the user device 101 may be activated to read a data stream stored in the NFC tag 105. Upon receiving the data stream, the user device 101 may display a confirmation screen 505 as depicted in FIG. 5B to the user to indicate that the NFC tag was read properly. The data stream may be parsed to determine if any available information is present, and if present, the information may be presented to the user.

FIG. 5C depicts an exemplary display screen 500 for presenting the available information to the user. The information may be presented to the user as a data card 510 displaying relevant information. Relevant information may include information regarding a location, information on instructions, or any other available information related to the location or item the NFC tag is placed. If there is more than one data card available, then the user may navigate between the different data cards using gestures or navigation commands. The data card 510 may be stored locally on the user device 101 and retrieved by the CPU 111 upon scanning the NFC tag. In another embodiment, the data card 510 may be stored on the server 125 and retrieved by the CPU 111 via network 120 upon scanning the NFC tag by the user device 101.

Figure 6C:
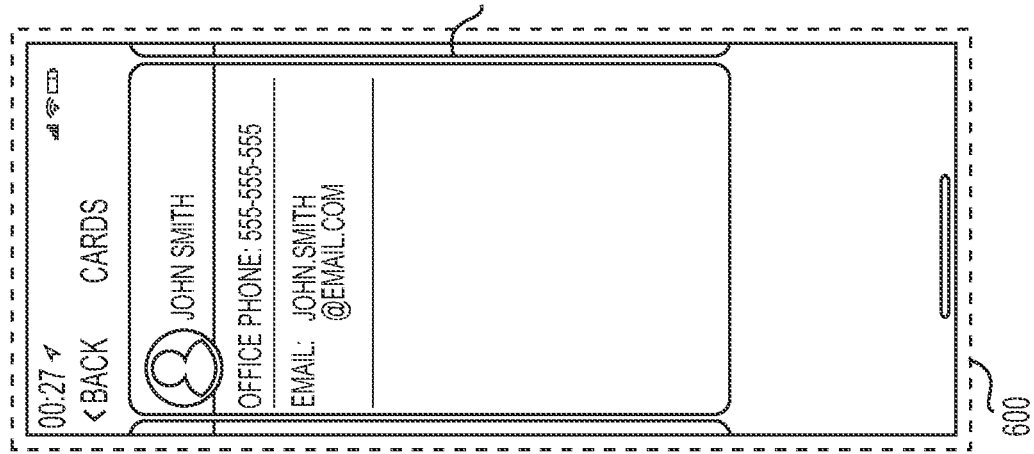
FIGS. 6A-6C depict exemplary user interfaces for operating the barcode scan sense, according to one aspect of the present disclosure.
Figure 6B:
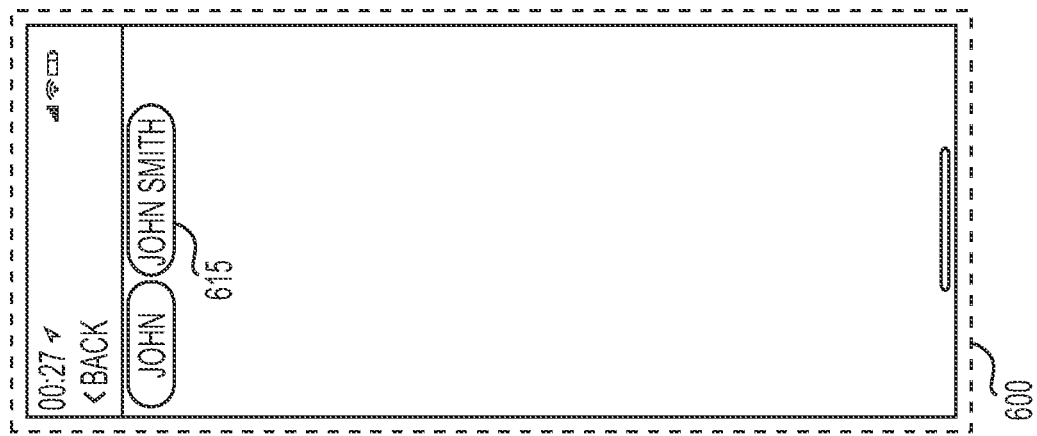
Figure 6A:
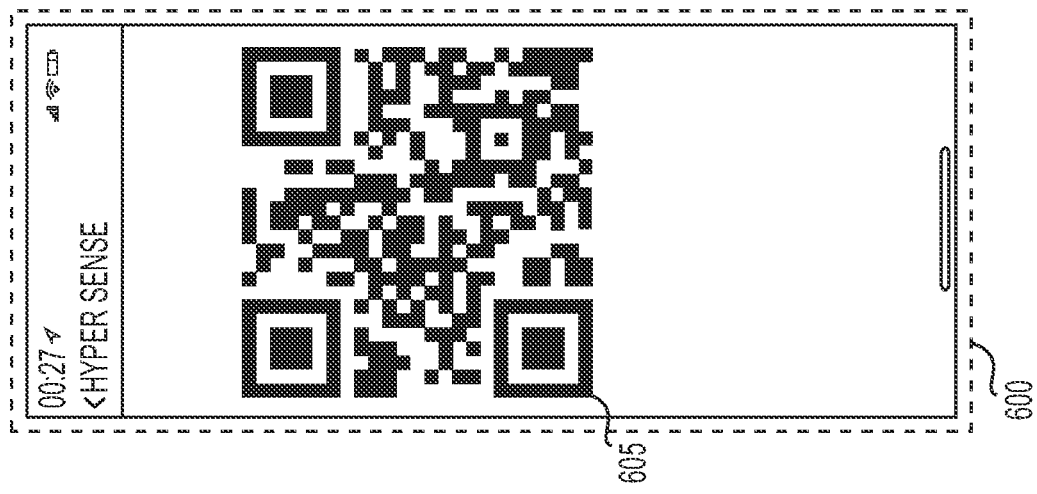

FIGS. 6A-6C depicts exemplary user interfaces (i.e., display screens 600) for operating the barcode scan sense, according to one aspect of the present disclosure. FIG. 6A depicts a display screen 600 of the user device 101. Display screen 600 of FIG. 6A may be triggered based on the user selecting the option of barcode scan sense. Upon the selection of the barcode scan sense, the user device 101 may activate the camera module 110 and display the preview screen 605 to the user. The user may utilize the preview screen 605 to align the camera onto a barcode for scanning. The user may also utilize the preview screen 605 to select an existing picture of a barcode. The existing picture may be a picture taken prior to the user selecting the option of barcode scanning sense. The existing picture may be located on the user device 101 or may be located on the server 125. The barcode may be a physical document (e.g., a paper based barcode), or the barcode may be a digital barcode displayed on a screen on a computing device. A barcode may be used to represent data in a visual form, and once read by a reader (e.g., user device 101) the data represented by the barcode may be parsed.

Upon reading the data stored in the barcode, a parsing process may be performed on the data to determine if any key terms are present as represented by exemplary FIG. 6B. Key terms may be terms where available information is present, and may be displayed via screen 615. Example key terms may include names of users, name of companies, locations, events, etc. As displayed in exemplary FIG. 6B, key terms indicating names may have been determined from the data of the barcode, and resulting user "John" and "John Smith" may be displayed to the user via screen 615. The key terms may be displayed via screen 615 with an indication that the key terms may be interactive. For example, the key terms may be displayed as a hyperlink, or a touchable design element to indicate to the user that more information related to the key terms may be available.

FIG. 6C depicts an exemplary display screen 600 for presenting the available information of the key terms to the user. The information may be presented to the user as a data card 620 displaying the relevant information. Relevant information may include name, contact information, place of employment, and any other available data associated with the barcode. If there are more than one data cards available, (e.g., when more than one key terms are present) then the user may navigate between the different data cards using gestures or navigation commands. The data card 620 may be stored locally on the user device 101 and retrieved by the CPU 111 upon an interaction by the user with the key terms. In another embodiment, the data card 620 may be stored on the server 125 and retrieved by the CPU 111 via network 120 upon an interaction by the user with the key terms.

Figure 7B:
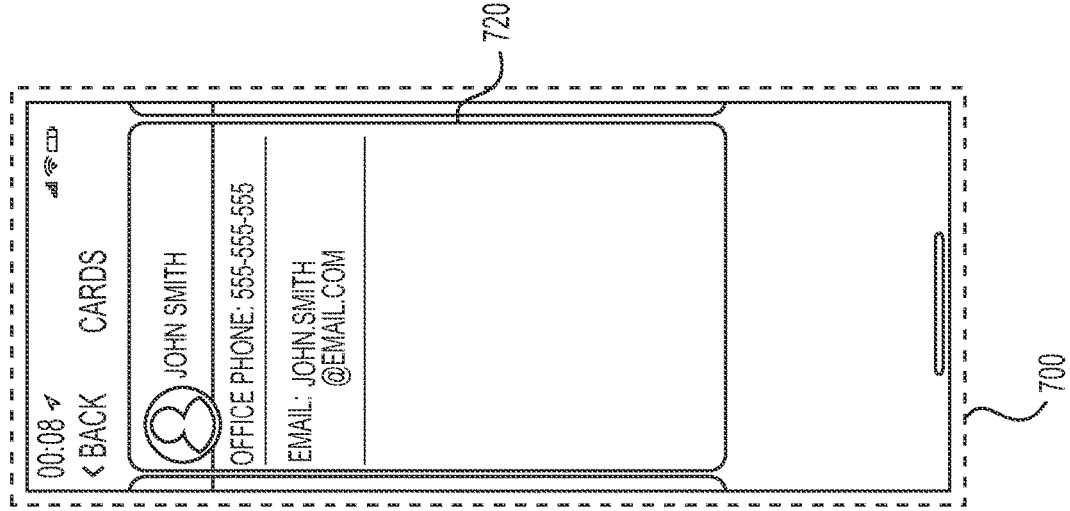
FIGS. 7A-7B depict exemplary user interfaces for operating the Bluetooth discovery sense, according to one aspect of the present disclosure.
Figure 7A:
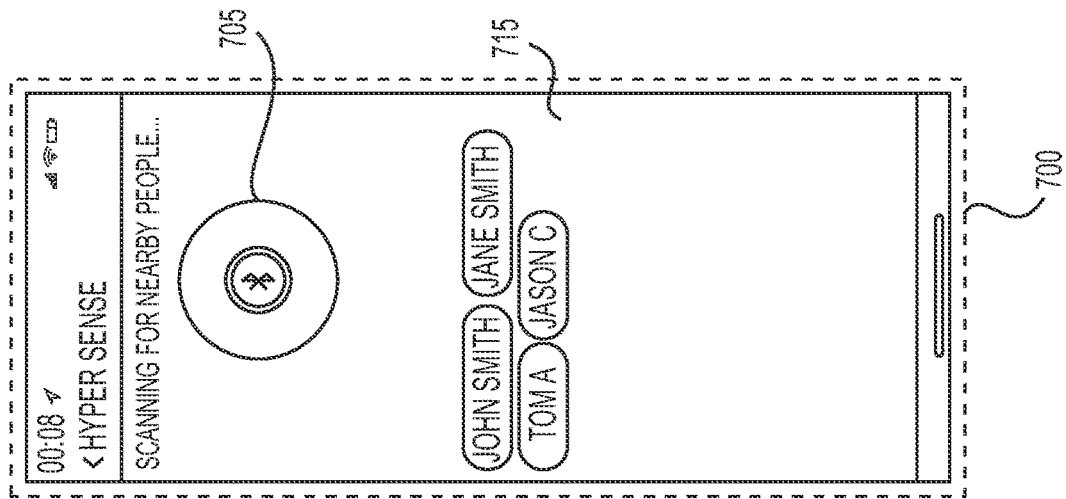

FIGS. 7A-7B depicts exemplary user interfaces (i.e., display screens 700) for operating the Bluetooth discovery sense, according to one aspect of the present disclosure. FIG. 7A depicts a display screen 700 of the user device 101. Display screen 700 of FIG. 7A may be triggered based on the user selecting the option of Bluetooth discovery sense. The Bluetooth discovery sense may be selected by selecting the option on the display 116 of the user device 101, or may be selected by pressing a hardware button on the user device 101, or may be selected by holding the user device 101 near another user device 101. Upon the selection of the Bluetooth discovery sense, the user device 101 may activate the Bluetooth module 115 and display the scanning screen 705 to the user.

Upon selection of the Bluetooth discovery sense, the user device 101 may be placed into a discovery state and may listen to signals broadcasted from other devices. Other devices may be other user devices 101 executing a projection application, where the projection application may actively broadcast identification information. Other devices may also broadcast identification information without the execution of the projection application. The exchange of identification information between the listening device and the broadcasting device may be performed via a secure channel of communication, and the communication may be encrypted on both devices. Each device may transmit an identification information that is unique to the device and the identification information may include information that identifies the type of device, the media access control address (MAC address) of the device, the user of the device, and/or any other relevant information. The identity information format may be defined by the server 125 and transmitted onto the user device 101, or may be defined by each user operating the user device 101.

Upon discovering other user devices 101 by the Bluetooth discovery sense, the discovered devices may be displayed as key terms on key term screen 715. Key terms may be terms where available information is present and may include names of users, name of devices, etc. As displayed in key term screen 715, key terms indicating names may have been discovered by the Bluetooth discover sense executing on user device 101, and the names may represent the operators of each of the other user devices. The key terms may be displayed via screen 715 with an indication that the key terms may be interactive. For example, the key terms may be displayed as a hyperlink, or a touchable design element to indicate to the user that more information related to the key terms may be available.

FIG. 7B depicts an exemplary user interface 700 for presenting the available information of the key terms to the user. The information may be presented to the user as a data card 720 displaying the relevant information. Relevant information may include, name, contact information, place of employment, and any other available data of the user. If there are more than one data cards available, (e.g., when more than one key terms are present) then the user may navigate between the different data cards using gestures or navigation commands. The data card 720 may be stored locally on the user device 101 and retrieved by the CPU 111 upon an interaction by the user with the key terms. In another embodiment, the data card 720 may be stored on the server 125 and retrieved by the CPU 111 via network 120 upon an interaction by the user with the key terms.

FIGS. 8A-8C depict exemplary user interfaces (i.e., display screens 800) for operating the label recognition sense, according to one aspect of the present disclosure. FIG. 8A depicts a display screen 800 of the user device 101. Display screen 800 of FIG. 8A may be triggered based on the user selecting the option of label recognition sense. Upon the selection of the label recognition sense, the user device 101 may activate the camera module 110 and display the preview screen 805 to the user. The preview screen 805 may display a user interface (e.g., shaded box or a colored outline) to indicate to the user the field of view of the camera. The user may utilize the preview screen 805 to align the camera onto a document for label recognition. The user may also utilize the preview screen 805 to select an existing picture of a label. The existing picture may be a picture taken prior to the user selecting the option of label recognition sense. The existing picture may be located on the user device 101 or may be located on the server 125. The document may be a physical document (e.g., paper based text document), or the document may be a digital document displayed on a screen of a computing device.

The label recognition sense may utilize the OCR function to determine the text present in the document in the field of view of the camera module 110. Once texts in the document are recognized, the label recognition sense may function by searching the text in the documents for predetermined label patterns. Predetermined label patterns may be for example, a name, an email address, a phone number, an address, or other relevant information. The predetermined label patterns may be configured and defined by the server 125 and transmitted to the user device 101, or the predetermined label patterns may be configured and defined on the user device 101.

Upon recognizing a predetermined label pattern from the text on the document, the label recognition sense may present an indication of the pattern recognized on screen portion 810. For example, as indicated by 810 in FIG. 8A, email addresses for "John Smith" may have been recognized by the label recognition sense. Once a label pattern has been recognized, key terms related to the recognized label pattern may be displayed to the user. As displayed in exemplary FIG. 8B, key terms of users "John Smith 1" and "John Smith 2" may be displayed to the user via screen 815. The key terms may be displayed via screen 215 with an indication that the key terms may be interactive. For example, the key terms may be displayed as a hyperlink, or a touchable design element to indicate to the user that more information related to the key terms may be available.

FIG. 8C depicts an exemplary user interface 800 for presenting the available information of the key terms to the user. The information may be presented to the user as a data card 820 displaying the relevant information. Relevant information may include, name, contact information, place of employment, and any other available data of the user. If there is more than one data card available, (e.g., when more than one key term is present) then the user may navigate between the different data cards using gestures or navigation commands. The data card 820 may be stored locally on the user device 101 and retrieved by the CPU 111 upon an interaction by the user with the key terms. In another embodiment, the data card 820 may be stored on the server 125 and retrieved by the CPU 111 via network 120 upon an interaction by the user with the key terms.

Figure 9B:
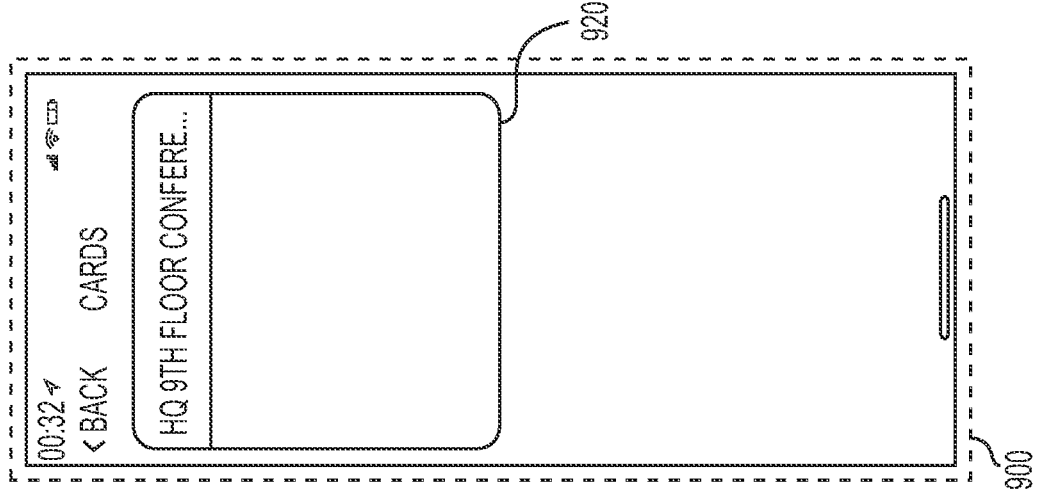
FIGS. 9A-9B depict exemplary user interfaces for operating the beacon recognition sense, according to one aspect of the present disclosure.
Figure 9A:
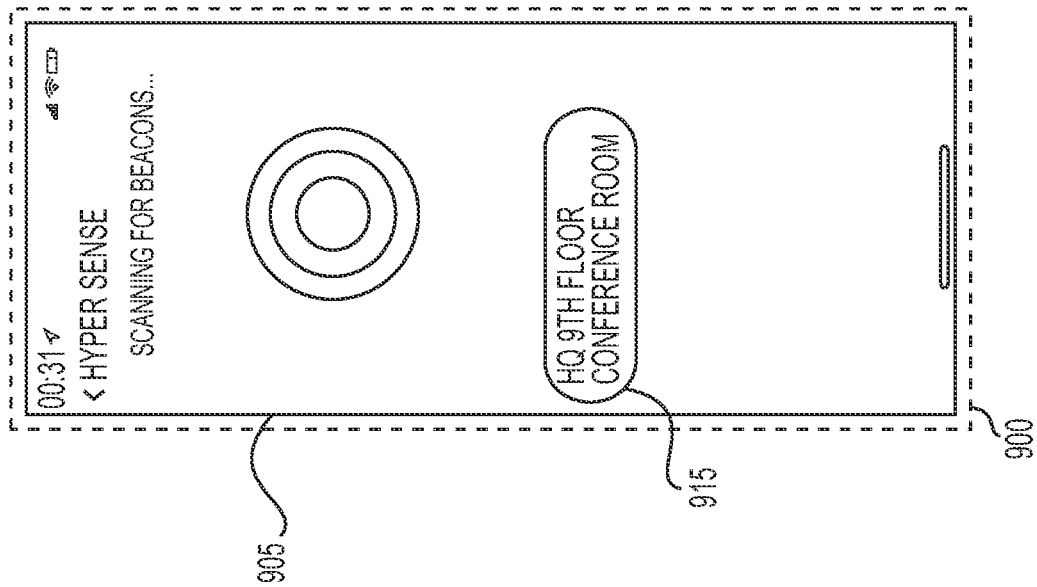

FIGS. 9A-9B depict exemplary user interfaces (i.e., display screens 900) for operating the beacon recognition sense, according to one aspect of the present disclosure. FIG. 9A depicts a display screen 900 of the user device 101. Display screen 900 of FIG. 9A may be triggered based on the user selecting the option of beacon recognition sense. The beacon recognition sense may be selected by selecting the option on the display 116 of the user device 101, or may be selected by pressing a hardware button on the user device 101, or may be selected by holding the user device 101 near a beacon 106. The beacon 106 may utilize Bluetooth low energy (BLE) signal to communicate with the user device 101. Upon the selection of the beacon recognition sense, the user device 101 may activate the wireless module 114 and/or Bluetooth module 115 and display the scanning screen 905 to the user.

Upon selection of the beacon recognition sense, the user device 101 may be placed into a discovery state and may listen to signals broadcasted from beacons located in the vicinity of the user. Each beacon may broadcast identification information that is unique to the device, and each beacon may also broadcast a data stream stored in the beacon. The data stream may be used to provide information related to the location of the beacon (e.g., a conference room schedule), or the data stream may be used to track the movements of the user device 101 (e.g., the time and communication of the user device with multiple beacons). Multiple beacons may also broadcast identification information and data stream in different formats, therefore, the wireless module 114 and/or Bluetooth module 115 may be configured to recognize the various formats of the multiple beacons.

Upon discovering one or more beacons by the beacon recognition sense, the discovered devices may be displayed as key terms on key term screen 915. Key terms may be terms where available information is present and may include names of users, name of devices, locations, etc. As displayed in key term screen 915, key terms indicating a location may have been discovered by the beacon recognition sense executing on user device 101. The key terms may be displayed via screen 915 with an indication that the terms may be interactive. For example, the key terms may be displayed as a hyperlink, or a touch-able design element to indicate to the user that more information related to the key terms may be available.

FIG. 9B depicts an exemplary user interface 900 for presenting the available information of the key terms to the user. The information may be presented to the user as a data card 920 displaying the relevant information. Relevant information may include information regarding a location, information on instructions, or any other available information related to the location the beacons are placed. If there is more than one data card available, (e.g., when more than one key terms are present) then the user may navigate between the different data cards using gestures or navigation commands. The data card 920 may be stored locally on the user device 101 and retrieved by the CPU 111 upon an interaction by the user with the key terms. In another embodiment, the data card 920 may be stored on the server 125 and retrieved by the CPU 111 via network 120 upon an interaction by the user with the key terms.

Figure 10A:
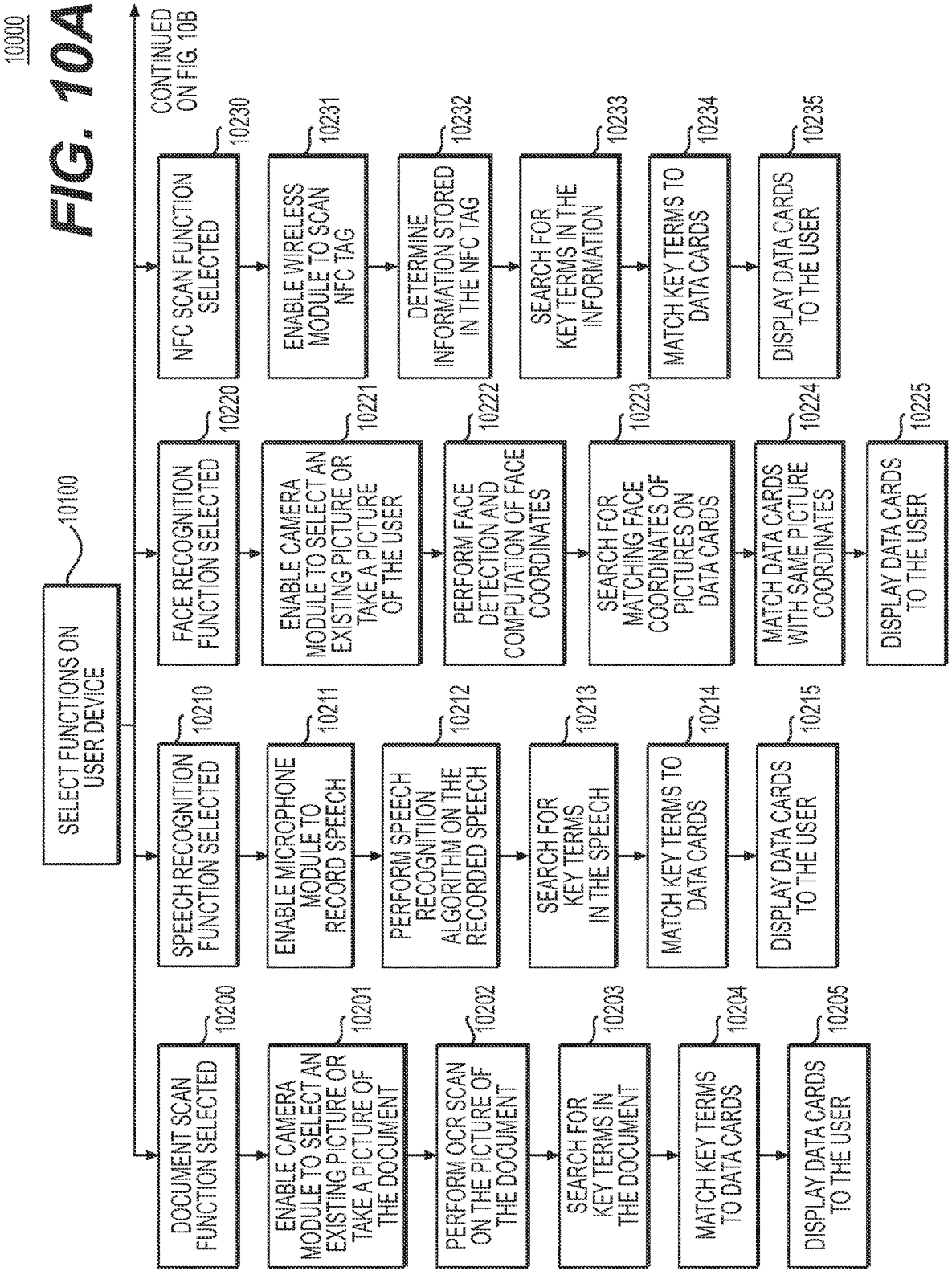

FIG. 10 depicts an exemplary flow diagram 10000 of operating proactive insight discovery with multiple senses, according to one aspect of the present disclosure. Diagram 10000 may begin with step 10100 where the user may select one of several functions to execute on the user device 101. The user may select the function of document scanning sense at step 10200. At step 10201, the user device 101 may enable the camera module to select an existing picture or take a picture of the document. Upon capturing a picture of the document, at step 10202 an OCR scan may be performed on the picture of the document. At step 10203, a search may be performed on the texts of the document to determine key terms in the document. At step 10204, the determined key terms may be matched to available data cards, and at step 10205, the available data cards of the key terms may be displayed to the user.

Additionally, the user may select the function of speech recognition sense at step 10210. At step 10211, the user device 101 may enable the microphone module to record speech. Upon capturing the speech, at step 10212 speech recognition processing may be performed on the captured speech to convert the speech into text. At step 10213, a search may be performed on the texts of the converted speech to determine key terms in the speech. At step 10214, the determined key terms may be matched to available data cards, and at step 10215, the available data cards of the key terms may be displayed to the user.

Additionally, the user may select the function of facial recognition sense at step 10220. At step 10221, the user device 101 may enable the camera module to select an existing picture or take a picture of a user. Upon capturing the picture, at step 10222 a face detection and computation of face coordinates may be performed on the captured picture. At step 10223, a search may be performed to determine matching face coordinates from pictures of user data cards. At step 10224, the user data cards with matching face coordinates may be determined, and at step 10225, the available data cards with matching face coordinates may be displayed to the user.

Additionally, the user may select the function of NFC scan sense at step 10230. At step 10231, the user device 101 may enable the wireless module to scan one or more NFC tags. Upon scanning the NFC tags, at step 10232 the data stream stored in the NFC tags may be determined. At step 10233, a search may be performed on the data stream information captured from the NFC tags to determine key terms in the information. At step 10234, the determined key terms may be matched to available data cards, and at step 10235, the available data cards of the key terms may be displayed to the user.

Additionally, the user may select the function of a barcode scan sense at step 10240. At step 10241, the user device 101 may enable the camera module to select an existing picture or take a picture of the barcode. Upon capturing the barcode, at step 10242 the data stream stored in the barcode may be determined. At step 10243, a search may be performed on the data stream information captured from the barcode to determine key terms in the information. At step 10244, the determined key terms may be matched to available data cards, and at step 10245, the available data cards of the key terms may be displayed to the user.

Additionally, the user may select the function of Bluetooth discovery sense at step 10250. At step 10251, the user device 101 may enable the Bluetooth module to discover devices. Upon discovering devices, at step 10252 relevant information from the discovered devices may be determined. Relevant information may include identification information of the discovered devices. At step 10253, a search may be performed for data cards assigned to or related to the identification information, and at step 10254, the available data cards related to the discovered devices may be displayed to the user.

Additionally, the user may select the function of label recognition sense at step 10260. At step 10261, the user device 101 may enable the camera module to select an existing picture or take a picture of information fields of a document. At step 10262, a determination may be made to locate any proper information patterns from the information fields. At step 10263, based on the determined information pattern, information related to the key terms may be determined. At step 10264, a search may be conducted for available data cards based on the information related to the key terms, and at step 10265, the available data cards of the key terms may be displayed to the user.

Additionally, the user may select the function of beacon recognition sense at step 10270. At step 10271, the user device 101 may enable the wireless module to discover one or more beacons. Upon scanning the beacons, at step 10272 the data stream stored in the beacons may be determined. At step 10273, a search may be performed on the data stream information captured from the beacons to determine key terms in the information. At step 10274, the determined key terms may be matched to available data cards, and at step 10275, the available data cards of the key terms may be displayed to the user.

While techniques discussed herein commonly discuss a user initiating the discovery mode of any of the senses, alternatively any or all of the senses may run in the background on user device 101, and the discovery mode may be perpetually activated. For example, the camera module 110 may be monitored, and the document scan, speech recognition, face recognition, barcode scan, and/or label recognition senses may monitor camera input. Input may be analyzed to determine which senses are relevant to the particular input. For example, if the camera module 110 inputs an image of a face, the facial recognition sense may be triggered, while the other senses may remain dormant in the background. Upon the triggering of a sense, one or more icons or other indicators may be displayed on the user device 101. These icons or indicators may directly display any matching data cards, or may give the user the option to display matching data cards.

As another example, the user device 101 may automatically monitor the Bluetooth module 115 for beacons and/or normal Bluetooth signals. This monitoring may be performed without any user input. If a beacon or Bluetooth signal is detected, the user may again be notified, an indicator may be displayed on the user device 101, and/or a data card may be displayed on the display of the user device 101.

The user may be able to curate which senses are permitted to automatically run in the background. In one technique, this may allow monitoring of a particular technology module on the user device 101. For example, the user may choose to allow the senses that utilize the Bluetooth module 115 to execute, but may choose to not allow automatic monitoring of the camera module 110 or microphone module 113. Alternatively, the user may disallow specific senses to operate in the background, and may, for example, allow the regular Bluetooth sense to run, but may disallow the beacon detection that may also utilize the Bluetooth module 115.

Figure 11:
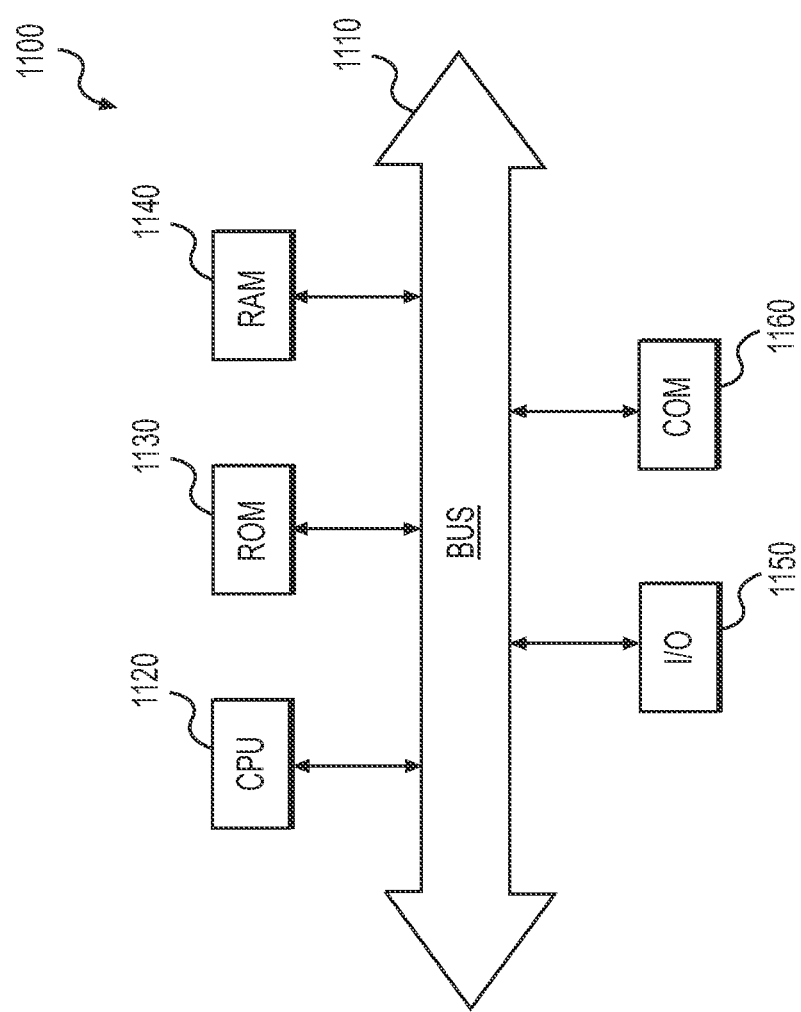
FIG. 11 depicts an exemplary computer device or system, in which embodiments of the present disclosure, or portions thereof, may be implemented.

FIG. 11 depicts a high-level functional block diagram of an exemplary computer device or system, in which embodiments of the present disclosure, or portions thereof, may be implemented, e.g., as computer-readable code. Additionally, each of the exemplary computer servers, databases, user interfaces, modules, and methods described above with respect to FIGS. 1-10 can be implemented in device 1100 using hardware, software, firmware, tangible computer readable media having instructions stored thereon, or a combination thereof and may be implemented in one or more computer systems or other processing systems. Hardware, software, or any combination of such may implement each of the exemplary systems, user interfaces, and methods described above with respect to FIGS. 1-10.

If programmable logic is used, such logic may be executed on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, at least one processor device and a memory may be used to implement the above-described embodiments. A processor device may be a single processor or a plurality of processors, or combinations thereof. Processor devices may have one or more processor "cores."

Various embodiments of the present disclosure, as described above in the examples of FIGS. 1-10, may be implemented using device 1100. After reading this description, it will become apparent to a person skilled in the relevant art how to implement embodiments of the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As shown in FIG. 11, device 1100 may include a central processing unit (CPU) 1120. CPU 1120 may be any type of processor device including, for example, any type of special purpose or a general-purpose microprocessor device. As will be appreciated by persons skilled in the relevant art, CPU 1120 also may be a single processor in a multi-core/multi-processor system, such system operating alone, or in a cluster of computing devices operating in a cluster or server farm. CPU 1120 may be connected to a data communication infrastructure 1110, for example, a bus, message queue, network, or multi-core message-passing scheme.

Device 1100 also may include a main memory 1140, for example, random access memory (RAM), and also may include a secondary memory 1130. Secondary memory 1130, e.g., a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage unit may comprise a floppy disk, magnetic tape, optical disk, etc., which is read by and written to by the removable storage drive. As will be appreciated by persons skilled in the relevant art, such a removable storage unit generally includes a computer usable storage medium having stored therein computer software and/or data.

In alternative implementations, secondary memory 1130 may include other similar means for allowing computer programs or other instructions to be loaded into device 1100. Examples of such means may include a program cartridge and cartridge interface (such as that found in video game devices), a removable memory chip (such as an EPROM, or PROM) and associated socket, and other removable storage units and interfaces, which allow software and data to be transferred from a removable storage unit to device 1100.

Device 1100 also may include a communications interface ("COM") 1160. Communications interface 1160 allows software and data to be transferred between device 1100 and external devices. Communications interface 1160 may include a modem, a network interface (such as an Ethernet card), a communications port, a PCMCIA slot and card, or the like. Software and data transferred via communications interface 1160 may be in the form of signals, which may be electronic, electromagnetic, optical, or other signals capable of being received by communications interface 1160. These signals may be provided to communications interface 1160 via a communications path of device 1100, which may be implemented using, for example, wire or cable, fiber optics, a phone line, a cellular phone link, an RF link or other communications channels.

The hardware elements, operating systems and programming languages of such equipment are conventional in nature, and it is presumed that those skilled in the art are adequately familiar therewith. Device 1100 also may include input and output ports 1150 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A computer-implemented method for proactive insight discovery, the method comprising:
    selecting, by one or more processors on a user device, one or more insight discovery functions from a plurality of insight discovery functions, the selected one or more insight discovery functions including an NFC scan function, a Bluetooth discovery function, or a beacon recognition function, by proximity of the user device to a near-field communication (NFC) tag, by proximity of the user device to at least one other Bluetooth-enabled device, and/or by proximity of the user device to a beacon;
    enabling, by the one or more processors, a software module based on the selected one or more insight discovery functions;
    receiving, by the one or more processors via the enabled software module, information associated with at least one of the NFC tag, the at least one other Bluetooth-enabled device, or the beacon;
    determining, by the one or more processors, at least one key term from the information;
    determining, by the one or more processors, at least one electronic data card associated with the at least one key term; and
    presenting, by the one or more processors, the at least one electronic data card to the user device based on a user interaction with the selected one or more insight discovery functions on the user device.

2. The computer-implemented method of claim 1, wherein the selected one or more insight discovery functions further include at least one of a document scan function, a barcode scan function, and/or a label recognition function, and wherein selecting the one or more insight discovery functions further includes a user selecting the document scan function, the label recognition function, or the barcode scan function, and wherein the method further include:
    enabling, by the one or more processors, a camera module attached to the user device; and
    determining, by the one or more processors, the at least one key term based on data recognized by the camera module.

3. The computer-implemented method of claim 1, wherein the selected one or more insight discovery functions further include a facial recognition function and wherein selecting the one or more insight discovery functions further includes a user selecting the facial recognition function, and wherein the method further includes:
    enabling, by the one or more processors, a camera module attached to the user device;
    capturing, by the one or more processors, an image of a facial element of a second user;
    computing, by the one or more processors, one or more coordinate values of the facial element of the second user; and
    determining, by the one or more processors, the at least one key term based on the one or more coordinate values.

4. The computer-implemented method of claim 1, wherein the selected one or more insight discovery functions include the NFC scan function or the beacon recognition function, and wherein receiving the information further includes:
    enabling, by the one or more processors, a wireless module attached to the user device;
    scanning, by the one or more processors via a wireless module, at least one of the NFC tag or the beacon; and
    receiving, by the one or more processors via the wireless module, information stored associated with the at least one of the NFC tag or the beacon.

5. The computer-implemented method of claim 1, wherein the selected one or more insight discovery functions include the Bluetooth discovery function, and wherein receiving the information further includes:
    enabling, by the one or more processors, a Bluetooth module attached to the user device;
    scanning, by the one or more processors via a wireless module, the at least one other Bluetooth-enabled device;
    receiving, by the one or more processors via the wireless module, information from the at least one other Bluetooth-enabled device; and
    determining, by the one or more processors, the at least one key term from the information.

6. The computer-implemented method of claim 1, wherein the selected one or more insight discovery functions further include a speech recognition function and wherein selecting the one or more insight discovery functions further includes a user selecting the speech recognition function, and wherein the method further includes:
    enabling, by the one or more processors, a microphone module attached to the user device;
    capturing, by the one or more processors via the microphone module, an audio segment;
    determining, by the one or more processors, text information based on the audio segment; and
    determining, by the one or more processors, the at least one key term from the text information.

7. A computer system for proactive insight discovery, the computer system comprising:
    at least one memory having processor-readable instructions stored therein; and
    at least one processor configured to access the memory and execute the processor-readable instructions, which when executed by the processor configured the processor to perform a plurality of functions, the functions comprising:

selecting, on a user device, one or more insight discovery functions from a plurality of insight discovery functions, the selected one or more insight discovery functions including an NFC scan function, a Bluetooth discovery function, or a beacon recognition function, by proximity of the user device to a near-field communication (NFC) tag, by proximity of the user device to at least one other Bluetooth-enabled device, and/or by proximity of the user device to a beacon;

enabling a software module based on the selected one or more insight discovery functions;

receiving, via the enabled software module, information associated with at least one of the NFC tag, the at least one other Bluetooth-enabled device, or the beacon;

determining at least one key term from the information;

determining at least one electronic data card associated with the at least one key term; and presenting the at least one electronic data card to the user device based on a user interaction with the selected one or more insight discovery functions on the user device.

8. The computer system of claim 7, wherein the selected one or more insight discovery functions further include at least one of a document scan function, a barcode scan function, and/or a label recognition function, and wherein selecting the one or more insight discovery functions further includes a user selecting the document scan function, the label recognition function, or the barcode scan function, and further includes functions for:

enabling a camera module attached to the user device; and determining the at least one key term based on data recognized by the camera module.

9. The computer system of claim 7, wherein the selected one or more insight discovery functions further include a facial recognition function and wherein selecting the one or more insight discovery functions further includes a user selecting the facial recognition function, and further includes functions for:

enabling a camera module attached to the user device;

capturing an image of a facial element of a second user;

computing one or more coordinate values of the facial element of the second user; and determining at least one key terms based on the one or more coordinate values.

10. The computer system of claim 7, wherein the selected one or more insight discovery functions include the NFC scan function or the beacon recognition function, and wherein receiving the information further includes functions for:

enabling a wireless module attached to the user device;

scanning at least one of the NFC tag or the beacon; and receiving information stored associated with the at least one of the NFC tag or the beacon.

11. The computer system of claim 7, wherein the selected one or more insight discovery functions include the Bluetooth discovery function, and wherein receiving the information further includes functions for:

enabling a Bluetooth module attached to the user device;

scanning the at least one other Bluetooth-enabled device;

receiving information from the at least one other Bluetooth-enabled device; and determining the at least one key term from the information.

12. The computer system of claim 7, wherein the selected one or more insight discovery functions further include a speech recognition function and wherein selecting the one or more insight discovery functions further includes a user selecting the speech recognition function, and further includes functions for:

enabling a microphone module attached to the user device;

capturing an audio segment;

determining text information based on the audio segment; and determining the at least one key term from the text information.

13. A non-transitory computer-readable medium comprising instructions for proactive insight discovery, the non-transitory computer-readable medium storing instructions that, when executed by at least one processor, configure the at least one processor to perform:

selecting, by one or more processors on a user device, one or more insight discovery functions from a plurality of insight discovery functions, the selected one or more insight discovery functions including an NFC scan function, a Bluetooth discovery function, or a beacon recognition function, by proximity of the user device to a near-field communication (NFC) tag, by proximity of the user device to at least one other Bluetooth-enabled device, and/or by proximity of the user device to a beacon;

enabling, by the one or more processors, a software module based on the selected one or more insight discovery functions;

receiving, by the one or more processors via the enabled software module, information associated with at least one of the NFC tag, the at least one other Bluetooth-enabled device, or the beacon;

determining, by the one or more processors, at least one key term from the information;

determining, by the one or more processors, at least one electronic data card associated with the at least one key term; and presenting, by the one or more processors, the at least one electronic data card to the user device based on a user interaction with the selected one or more insight discovery functions on the user device.

14. The non-transitory computer-readable medium of claim 13, wherein the selected one or more insight discovery functions further include a facial recognition function and wherein selecting the one or more insight discovery functions includes a user selecting the facial recognition function, and further includes:

enabling, by the one or more processors, a camera module attached to the user device;

capturing, by the one or more processors, an image of a facial element of a second user;

computing, by the one or more processors, one or more coordinate values of the facial element of the second user; and determining, by the one or more processors, the at least one key term based on the one or more coordinate values.

15. The non-transitory computer-readable medium of claim 13, wherein the selected one or more insight discovery functions include the NFC scan function or the beacon recognition function, and wherein receiving the information further includes:

enabling, by the one or more processors, a wireless module attached to the user device;

scanning, by the one or more processors via the wireless module, at least one of the NFC tag or the beacon; and receiving, by the one or more processors via the wireless module, information stored associated with the at least one of the NFC tag or the beacon.

16. The non-transitory computer-readable medium of claim 13, wherein the selected one or more insight discovery function includes functions include the Bluetooth discovery function, and wherein receiving the information further includes:

enabling, by the one or more processors, a Bluetooth module attached to the user device;

scanning, by the one or more processors via a wireless module, the at least one other Bluetooth-enabled device;

receiving, by the one or more processors via the wireless module, information from the at least one other Bluetooth-enabled device; and determining, by the one or more processors, the at least one key term from the information.

17. The non-transitory computer-readable medium of claim 13, wherein the selected one or more insight discovery functions further include a speech recognition function and wherein selecting the one or more insight discovery functions further includes a user selecting the speech recognition function, and wherein the method further includes:

enabling, by the one or more processors, a microphone module attached to the user device;

capturing, by the one or more processors via the microphone module, an audio segment;

determining, by the one or more processors, text information based on the audio segment; and determining, by the one or more processors, the at least one key term from the text information.

* * * * *

UNITED STATES PATENT AND TRADEMARK OFFICE
CERTIFICATE OF CORRECTION

PATENT NO. : 11,880,410 B2
APPLICATION NO. : 17/165355
DATED : January 23, 2024
INVENTOR(S) : Liang Chen et al.

It is certified that error appears in the above-identified patent and that said Letters Patent is hereby corrected as shown below:

On the Title Page

Item [73], delete "Corner (VA)" and insert --Corner, VA (US)--.

In the Claims

In Column 21, Claim 16, Line 10, before "functions" delete "function includes".

Signed and Sealed this
Twenty-seventh Day of February, 2024

Katherine Kelly Vidal
*Director of the United States Patent and Trademark Office*